Feb. 28, 1950 — R. A. FRYKLUND — 2,498,990
APPARATUS FOR DRIVING FLEXIBLE MEMBERS
Filed Feb. 27, 1947 — 2 Sheets-Sheet 1

*INVENTOR.*
ROBERT A. FRYKLUND
BY
HIS ATTORNEY

Feb. 28, 1950     R. A. FRYKLUND     2,498,990
APPARATUS FOR DRIVING FLEXIBLE MEMBERS
Filed Feb. 27, 1947     2 Sheets-Sheet 2

INVENTOR.
ROBERT A. FRYKLUND
BY
HIS ATTORNEY

Patented Feb. 28, 1950

2,498,990

UNITED STATES PATENT OFFICE 2,498,990

APPARATUS FOR DRIVING FLEXIBLE MEMBERS

Robert A. Fryklund, Somerville, Mass., assignor to Raytheon Manufacturing Company, a corporation of Delaware Application February 27, 1947, Serial No. 731,181

10 Claims. (Cl. 259—72)

The present invention relates to a new and useful improvement in means for vibrating membranes, and diaphragms. The invention is of particular application for driving a diaphragm fixed or clamped at its edges. Such diaphraghms are chiefly used for acoustic applications as they provide one of the most convenient means of producing and receiving sounds. At the present time numerous forms of diaphragm-type telephones and microphones are in daily use. Large diaphragms have also been used as sources of sound energy in the transmission of sound over long distances under water and are now being used as a means of producing cavitation in liquids in a variety of commercial applications. For example, a clamped resonant diaphragm driven electromagnetically at power levels above cavitation is applied in the dairy industry for homogenizing milk.

It is the object of the present invention to provide means for attaining increased amplitudes of vibration in diaphragms of this type using driving means having a given amplitude of movement. The invention is of particular value when design limitations of the drive means restrict movement below the amplitudes desired. By means of the present invention, the amplitude of vibration of the diaphragm may be made several times the amplitude of the driving member.

The advantages of the invention will be best understood from the following description of several exemplifications thereof, reference being made to the accompanying drawings in which.

Figure 1:
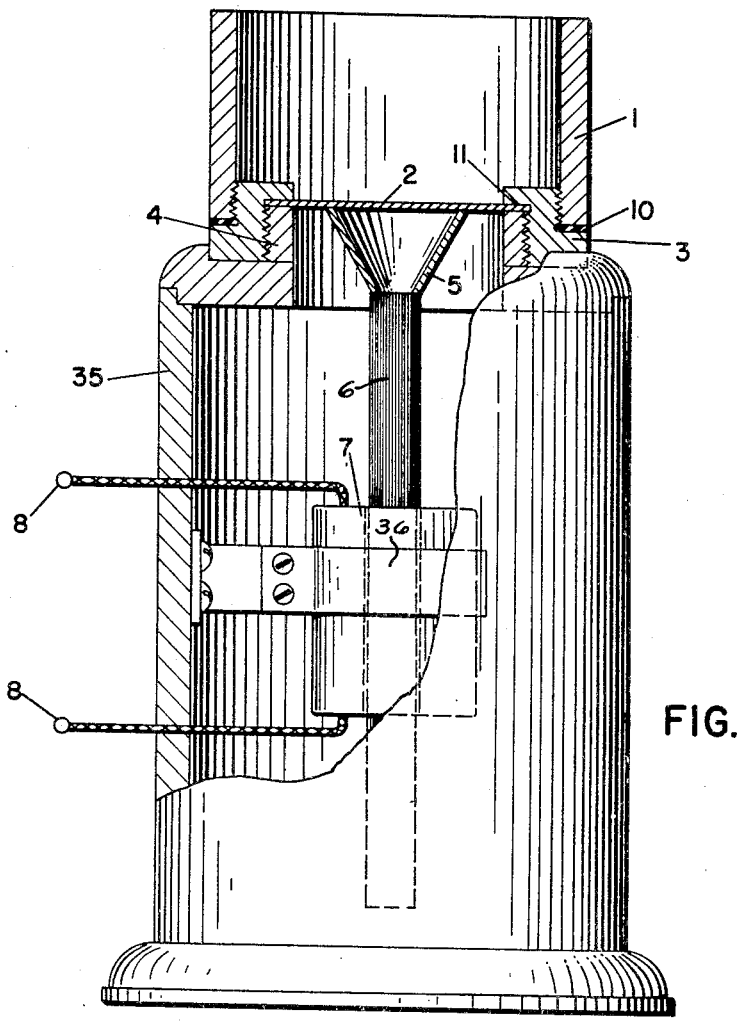
Figure 1 shows in vertical cross section a preferred embodiment of the present invention applied to a clamped diaphragm driven by magnetostrictive driving means.

The embodiments shown in the drawings are suitable for subjecting liquid contained in the cup 1 to the action of the diaphragm 2, and have been used to study the chemical and physical effects which may be attained in this way.

For this purpose it is desirable to drive the diaphragm with as great an amplitude as possible as the power of the compressional wave vibrations produced and the effects resulting therefrom in the liquid are proportional to the amplitude of the diaphragm at any particular frequency. It is particularly useful to cause the diaphragm to vibrate with sufficient amplitude to cause cavitation in the liquid, as the forces of cavitation of themselves cause certain chemical and physical effects.

Referring to Figure 1, the diaphragm 2 is driven by a drive means 6 which is a laminated stack of a magnetostrictive metal such as nickel. It is well known that when a magnetostrictive bar of this nature is subjected to a fluctuating magnetic field, the length of the bar varies slightly as the magnetic field varies. If the electromagnetic fluctuations are applied at a rate causing the bar to vibrate longitudinally at its natural resonant frequency, the amplitude of this vibration is made a maximum, although the amplitude of vibration is nevertheless quite limited. For example, in Figure 1, if the drive member 6 is a laminated nickel stack about nine inches long, it will have a natural resonant frequency of about 9000 cycles per second. If an alternating current voltage of the proper frequency to drive the stack at its resonant frequency is impressed across the terminals 8 of coil 7, the amplitude of longitudinal vibration of the stack will be made a maximum for a given power input. Thus with 40 watts of power available, if the frequency of the applied voltage is adjusted to give the maximum vibration of the stack, the greatest amplitude of vibration possible will be about 0.0004 inch. By means of the present invention, as will be described, it is possible to cause the center of the diaphragm 2 to vibrate with several times this amplitude.

Circular diaphragm 2 is tightly clamped between the clamping members 3 and 4. The circular collar 3 is internally threaded up to the shoulder 11 against which the diaphragm is fixed by tightly screwing in the threaded ring 4. The shoulder 11 and ring 4 are broad enough and the clamping is tight enough so that the diaphragm is held rigidly at its edges. The drive means 6 is attached to the diaphragm 2 by means of a conical connecting member 5, the function of which will be explained below in connection with Fig. 2. The diaphragm, as well as the cup 1 and the other members, may be constructed of any desired metal, for example, stainless steel. The entire assembly of elements 1, 2, 3, 4, 5, 6 is supported on the hollow pedestal 35. The coil 7, within which the magnetostrictive stack 6 fits, is fixed to the pedestal 35 by means of the bracket 36. This construction has special advantages in the operation of the invention as it leaves the drive means freely suspended from the diaphragm 2. It is not necessary to clamp the member 6 at any point and maximum driving efficiency may be attained.

The thickness of the diaphragm, insofar as it determines the resonant frequency of the diaphragm, is of special significance in practicing the invention in two cases; one, when the diaphragm is thin enough so that the resonant frequency is below the frequency of the driving means and, two, when the thickness is such that the resonant frequency of the diaphragm is substantially equal to the frequency of the drive means.

Figure 2:
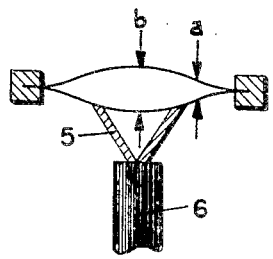
Figure 2 shows schematically the principal mode of vibration of the clamped diaphragm of Fig. 1.

Figure 2 shows the principal mode of vibration encountered in the case when the diaphragm has a resonant frequency substantially the same as that of the drive means. Figure 2 is also intended to show the general principle utilized in the invention. It is apparent that if a diaphragm is driven by a drive means acting at the center of the diaphragm, in order to vibrate the diaphragm sufficiently to obtain an amplitude $b$ at the center of the diaphragm, the drive means must have an amplitude $b$. However, if the drive means does not act at the center of the diaphragm, but along an annulus of the diaphragm, as shown in Figure 2, and if the drive means has an amplitude $a$, the center of the diaphragm will have a greater amplitude $b$. This occurs since the stiffness of the diaphragm maintains the mode of vibration illustrated so that a drive means not acting at the center of the diaphragm will cause an amplified movement at the center of the diaphragm. It is impossible in this case to state precisely what the optimum annulus of the diaphragm is at which the force should be applied. One important consideration is that as the driving force is applied nearer and nearer to the clamped edges of the diaphragm, a greater driving force is required to move the cone a given distance. Consequently the driving force available may be a limitation on extending the radius of the annulus too greatly. However, a magnetostrictive drive member, as described herein, develops great forces although only having a small amplitude, so that the cone may be widened substantially in this particular application of the invention.

The cone 5 may be welded to the diaphragm and the driving member 6 or any other desired means may be used to couple the cone to the diaphragm and the driving means. The walls of the cone should be as thin as possible consistent with the strength required and the connection to the diaphragm must be localized as much as possible on the circumference of the circle determined by the open end of the cone. These requirements are observed so that the mode of vibration of the diaphragm is not substantially altered.

Figure 3:
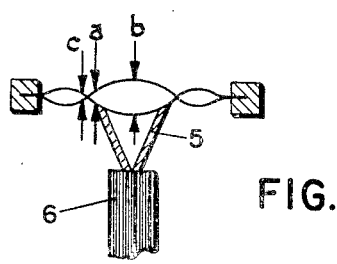
Figure 3 shows schematically another mode of vibration of the clamped diaphragm.

Figure 3 shows the principal mode of vibration in the case when the diaphragm has a resonant frequency substantially lower than the resonant frequency of the drive means. In this case the diaphragm may be made to vibrate in such a manner that a circular node which is motionless will be established. The radius of this node may be determined experimentally or theoretically by techniques known to the art. Applying the present invention to a diaphragm vibrating in this manner, the radius of the coupling cone 5 should be made such that it is slightly greater or slightly less than the radius of this nodal circle. When the driving force is applied as stated, a given amplitude $a$ of the drive means will produce an amplified amplitude $b$ at the center of the diaphragm, as shown in Figure 3.

Figure 4:
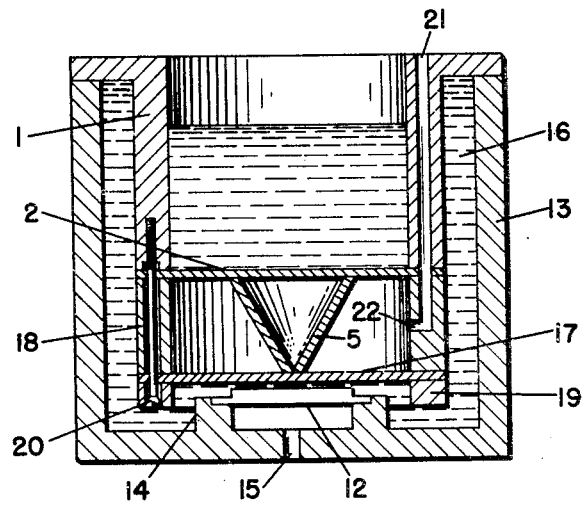
Figure 4 shows in vertical cross section an embodiment of the invention as applied to a piezoelectric driving means.
Figure 5:
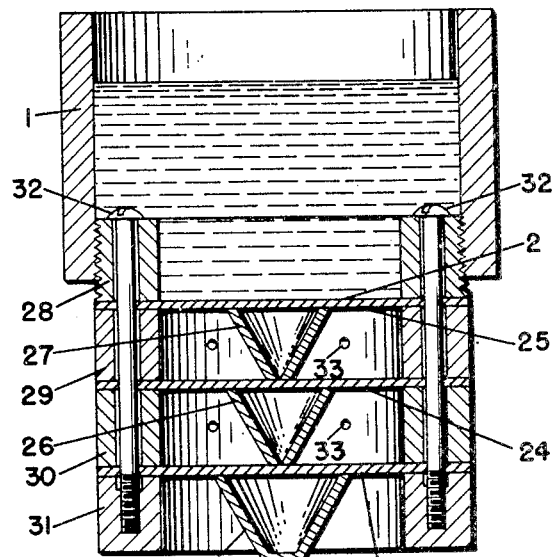
Figure 5 shows in vertical cross section a multiple application of the driving means of the present invention.

The principles which have been developed in connection with Figures 1 and 2 may be applied in a variety of ways. Figures 4 and 5 show two such modifications of the invention.

Referring to Figure 4, a modification of the invention is shown which is suitable for amplifying the amplitude of vibration of a diaphragm driven by a piezoelectric crystal. As a piezoelectric crystal like a magnetostrictive rod has a very limited amplitude of vibration, the present invention is equally valuable for this application. In Figure 4, the container 1 holding the material to be subjected to vibration is placed within the container 13. The piezoelectric crystal 12, of suitable characteristics, is cemented to the circular ring or boss 14 extending from the bottom of the container 13. A vent 15 permits entrance of air to the lower face of the crystal to prevent hermetically sealing the lower face of the crystal which would decrease the amplitude of vibration. To simplify the drawing, the electrical connections to the crystal are not shown. A high frequency alternating current voltage is applied to the crystal at its natural resonant frequency. Over the face of the crystal and surrounding the container 1 in the annular space 16 is a liquid such as an insulating oil which couples the crystal 12 to the diaphragm 17. The maximum movement of this diaphragm is at the center of the diaphragm which is placed directly over the center of the crystal. The present invention may be used to amplify the movements of this diaphragm 17 by fixing the tip of the cone 5 at the center of diaphragm 17 and fixing the open end of the cone 5 to an annulus of diaphragm 2. As developed previously, the amplitude of the center of diaphragm 2 will be made several times the amplitude of the center of diaphragm 17 by this method. The diaphragms 2 and 17 may be clamped to the bottom of the container 1 by means of the spacing rings 18 and 19 and a plurality of screws 20. A hole 21 is drilled in the wall of the container 1 joining the hole 22 in the compartment of the cone 5 so that the compartment is not hermetically sealed. The oil may be permanently sealed between the containers 1 and 13 as the heavy metal construction of these containers will provide a suitable path of heat conduction to prevent overheating of the crystal or oil due to the energy of vibration.

In Figure 5, another modification of the present invention is shown, indicating how greatly amplified vibrations of a diaphragm may be obtained by utilizing a multiplicity of drives of this type. Here, the diaphragm 23, driven by a magnetostrictive drive member 6 and cone 5, is coupled to the diaphragms 24 and 2 by cones 26 and 27. All the diaphragms are tightly clamped between the rings 28, 29, 30 and 31 by a number of screws 32 spaced around the circumference of the diaphragms. The holes 33 drilled in the rings prevent hermetically sealing the enclosed cone compartments so that movements of the diaphragms will not be air locked. As explained in connection with Figure 1, the method of driving diaphragm 23 by means of the cone 5 will cause the center of diaphragm 23 to vibrate with a greater amplitude than that imparted to it by drive means 6. Similarly the center of diaphragm 22 will have a greater amplitude than the center of diaphragm 23; the center of diaphragm 2 will have a greater amplitude than the center of diaphragm 24. In this way the amplitude of diaphragm 2 of Figure 4 may be made many times the amplitude of the drive means used.

Figure 6:
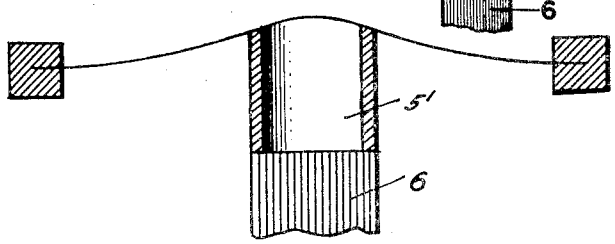
Fig. 6 illustrates a modification of Fig. 2.

Many modifications of this invention will suggest themselves to those skilled in the art. It is to be understood that the scope of the invention is not limited to the particular exemplifications described. For example, while the driving means illustrated utilizes a cone, it is apparent any means for applying the driving force along an annulus of a diaphragm would be just as suitable, such as a cylinder 5' as shown in Fig. 6, or a plurality of properly placed driver rods. Again, application of the invention may be made to any desired type of drive means as well as to magnetostrictive or piezoelectric drives, and may be applied as well to diaphragms which are not circular. It is also apparent the principles of the invention may be applied to any flexible member fixed at two or more points for amplifying flexing of the member. Amplification will be obtained by applying the driving force at a plurality of points preferably equidistant from the antinode of the flexible member. Therefore it is desired that the following claims be given a broad interpretation commensurate with the scope of the invention and limited only by the prior art.

Having now described my invention, I claim:

1. A vibrator comprising a casing, a diaphragm, means clamping the diaphragm at its periphery in said casing, a magnetostrictive driving rod, means attaching one end of the rod to the diaphragm on an annulus concentric with the clamped periphery, the rest of the rod hanging freely from the attached end, and coil means surrounding the rod, the rod and diaphragm both having natural frequencies of resonance.

2. Apparatus for driving a flexible member adapted to vibrate at a particular frequency of resonance consisting of the flexible member, supporting means fixing the flexible member at a plurality of points whereby the said flexible member may flex between the supporting points setting up antinodes, drive means in the form of an elongated magnetostrictive member operative at a natural frequency of resonance, and coupling means connecting the drive means at one end to the flexible member at points substantially equidistant from an antinode of the flexible member, the rest of said drive means hanging freely from the coupled end.

3. In a vibrator, a diaphragm adapted to vibrate at a particular frequency of resonance, means clamping the diaphragm around its edges, a drive means in the form of an elongated magnetostrictive member operative at a natural frequency of resonance, means coupling the drive means at one end to the diaphragm, said coupling means applying the driving force at points on an annulus of the diaphragm surrounding an antinode of vibration, the rest of said drive means hanging freely from the coupled end.

4. In a vibrator, a diaphragm adapted to vibrate at a particular frequency of resonance, means clamping the diaphragm around its edges, a drive means in the form of an elongated magnetostrictive member operative at a natural frequency of resonance, a conical connector having the open end of the cone fixed to an annular ring of the diaphragm surrounding an antinode of vibration, and the other end of the cone fixed to the drive means at one end thereof, the remainder of said drive means hanging freely from said cone.

5. In a vibrator, a diaphragm adapted to vibrate at a particular frequency of resonance, means clamping the diaphragm around its edges, a drive means in the form of an elongated magnetostrictive member operative at a natural frequency of resonance, a cylindrical connector having one end of the cylinder fixed to an annular ring of the diaphragm surrounding an antinode of vibration and the other end of the cylinder fixed to the drive means at one end thereof, the remainder of said drive means hanging freely from said cone.

6. In a vibrator, a diaphragm adapted to vibrate at a particular frequency of resonance, means clamping the diaphragm around its edges, a drive means in the form of an elongated magnetostrictive member operative at a natural frequency of resonance, a plurality of connectors coupling the drive means at one end to the diaphragm at points on an annulus of the diaphragm surrounding an antinode of vibration, the rest of said drive means hanging freely from the coupled end.

7. In a vibrator including a plurality of diaphragms and a drive means, means clamping each of the diaphragms around its edges positioning a first diaphragm above the driving means and the other diaphragms above the first diaphragm, coupling means connecting the first diaphragm to the driving means and other coupling means connecting each of the other diaphragms to the first diaphragm and to each other whereby each of the other diaphragms is driven by the diaphragm below it, said coupling means being adapted to apply the driving force to an annulus of the first diaphragm and said other coupling means being adapted to act substantially at the center of the diaphragm below it and along an annulus of the diaphragm above it, said driving means and diaphragms having each a natural frequency of resonance.

8. In a vibrator, a drive means in the form of an elongated magnetostrictive member having a fixed frequency of vibration, a diaphragm which has a natural resonant frequency substantially lower than the frequency of the drive means and having a circular node of vibration, means clamping the diaphragm around its edges, means coupling the drive means at one end to the diaphragm, said coupling means being arranged to apply the driving force to an annulus of the diaphragm slightly larger than the nodal circle of the diaphragm, the rest of said drive means hanging freely from the coupled end.

9. In a vibrator, a drive means in the form of an elongated magnetostrictive member having a fixed frequency of vibration, a diaphragm which has a natural resonant frequency substantially lower than the frequency of the drive means and having a circular node of vibration, means clamping the diaphragm around its edges, means coupling the drive means at one end to the diaphragm, said coupling means being arranged to apply the driving force to an annulus of the diaphragm slightly smaller than the nodal circle of the diaphragm, the rest of said drive means hanging freely from the coupled end.

10. In a vibrator, a circular diaphragm adapted to vibrate at a particular frequency of resonance, means clamping the diaphragm around its edges, a drive means also operative at said frequency, and means coupling the drive means at one end to the diaphragm at points on an annulus concentric with the clamping means, the rest of said drive means hanging freely from the coupled end.

ROBERT A. FRYKLUND.

REFERENCES CITED

The following references are of record in the file of this patent:

UNITED STATES PATENTS

| Number | Name | Date |
|---|---|---|
| 942,897 | Garrett et al. | Dec. 14, 1909 |
| 1,318,740 | Fessenden | Oct. 14, 1919 |
| 1,388,626 | Willett | Aug. 23, 1921 |
| 1,882,401 | Pierce | Oct. 11, 1932 |
| 2,031,789 | Pierce | Feb. 25, 1936 |
| 2,073,561 | McCracken | Mar. 9, 1937 |